Patented Dec. 5, 1944

2,364,398

UNITED STATES PATENT OFFICE 2,364,398

PRODUCTION OF 2-MERCAPTO-THIAZOLINE

Halsey B. Stevenson, Wilmington, Del., assignor to E. I. du Pont de Nemours & Company, Wilmington, Del., a corporation of Delaware No Drawing. Application July 7, 1939,
Serial No. 283,179

13 Claims. (Cl. 260—302)

This invention relates to improved methods for the production of 2-mercapto-thiazoline.

2-mercapto-thiazoline has the formula

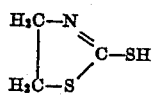

This compound is a very effective accelerator for the vulcanization of rubber. However, it has not been employed commercially for the reason that no economical method of making the compound in substantial yields has been known. It has been proposed to prepare this compound by refluxing an alkaline alcoholic solution of 1 mole of ethanolamine with about 1 mole of carbon disulfide. Such method has not proved to be satisfactory in practice due to the low yields, on the order of about 12 or 13% of theory.

It is an object of the present invention to provide an improved method for the preparation of 2-mercapto-thiazoline. Another object is to provide a method for producing 2-mercapto-thiazoline in greatly improved yields. A further object is to provide a more economical method of producing 2-mercapto-thiazoline. Still further objects are to advance the art. Still other objects will appear hereinafter.

These objects may be accomplished in accordance with my invention which comprises heating a mixture of 1 mole of ethanolamine with at least 1.5 moles of carbon disulfide at temperatures of at least 50° C. I have found that, when the amount of carbon disulfide is increased to at least 1.5 moles, a very material increase in the yield of 2-mercapto-thiazoline is obtained. When the amount of carbon disulfide is increased to at least 2 moles, and preferably from about 2 to about 3 moles, the best yields of 2-mercapto-thiazoline are obtained.

While the reaction may be caused to take place in the absence of a solvent, I have found that the best results are obtained in the presence of an inert solvent, and particularly in a hydroxylated solvent. By "a hydroxylated solvent," I mean water and the various alcohols. Of the various alcohols, I prefer the low molecular weight alcohols such as methanol and ethanol. The preferred solvent to be employed in accordance with my invention is water.

While the reaction will take place in the absence of a base, I have found that the best results are obtained if the reaction is caused to take place in the presence of a strong base such as an alkali metal hydroxide, e. g. sodium hydroxide and potassium hydroxide. The use of the alkali metal hydroxide is particularly advantageous when a hydroxylated solvent is employed.

The temperature for carrying out the reaction may be varied between room temperature and any higher temperature which can be conveniently attained. However, I have found that the reaction rate is inconveniently slow at the lower temperatures near room temperatures. Accordingly, I have found that it is desirable to use temperatures of at least 50° C. and preferably the temperature of reflux of the reaction mixture, particularly at atmospheric pressures. The time for the reaction to take place depends somewhat upon the temperature, but at the reflux temperature of the mixture, 6 to 12 hours is usually sufficient. If the heating is continued for too long a period of time, some decomposition of the 2-mercapto-thiazoline may take place.

The product obtained from the reaction may be purified by recrystallization from water, alcohol, benzene or other suitable solvent, or it may be dissolved in an alkaline solution from which it may be precipitated by an acid. As produced, it is in the form of a white powder or crystalline material, easily ground and readily dispersible in rubber. It is odorless and imparts no odor or discoloration to the vulcanized rubber.

In order to illustrate my invention more clearly, the preferred modes of carrying the same into effect and the advantageous results to be obtained thereby, the following examples are given, in which Example I illustrates the method heretofore proposed for preparing the compound, and Example II illustrates the method of my invention:

Example I

A mixture of 3 parts ethanol amine, 3 parts alcohol, 4 parts carbon disulfide, and 1 part potassium hydroxide was refluxed on a water bath for 8 hours. The alcohol was evaporated, and the residue was cooled. By rubbing with a glass rod, crystals were made to separate. These were recrystallized from water, after which they melted at 105–106° C. The yield of 2-mercapto-thiazoline was 12% of theory. The ratio of carbon disulfide to ethanol amine was 1.07 to 1.

Example II

Into a flask equipped with a good reflux condenser were placed 1 mole of ethanol amine, 2.8 moles of carbon disulfide, 2 moles of sodium hydroxide, and 8 moles of water. The mixture was refluxed for 8 hours on a water bath, then cooled and the contents allowed to crystallize.

The product was crystallized from water, after which it melted at 105-106° C. The yield of 2-mercapto-thiazoline was 40% of theory.

From the above examples, it will be apparent that, by my method as exemplified in Example II, it is possible to obtain very greatly increased yields of 2-mercapto-thiazoline at a correspondingly lower cost.

While the above examples disclose the preferred embodiment of my invention, it will be understood that such examples are illustrative only and that my invention is not to be limited to the specific embodiment shown therein. Many variations and modifications may be made in the process without departing from the scope of my invention, and particularly in the solvent, the base and the proportions employed. For example, other solvents, which may be employed, include benzene, xylene, cyclohexane, carbon tetrachloride, gasoline and the like, or mixtures of two or more of such solvents or the other solvents hereinbefore disclosed. The best results will generally be obtained when the solvent employed is such that the reactants are reasonably soluble in it at the temperature of the reaction. The primary feature of my invention which appears to be mainly responsible for the greatly increased yields over those of the prior art is the use of the larger proportion of carbon disulfide.

An improvement on this invention, wherein higher temperatures are employed to greatly increase the yields, is disclosed and claimed in the co-pending application of Ira Williams, Bernard M. Sturgis and John J. Verbanc, Serial No. 283,182 filed July 7, 1939.

I claim:

1. The method of making 2-mercapto-thiazoline which comprises heating a mixture of one mole of ethanol amine and at least 2 moles of carbon disulfide at a temperature of at least 50° C.

2. The method of making 2-mercapto-thiazoline which comprises heating a mixture of one mole of ethanol amine and from about 2 to about 3 moles of carbon disulfide at a temperature of at least 50° C.

3. The method of making 2-mercapto-thiazoline which comprises heating a solution of one mole of ethanol amine and at least 2 moles of carbon disulfide in a hydroxylated solvent at a temperature of at least 50° C.

4. The method of making 2-mercapto-thiazoline which comprises heating a solution of one mole of ethanol amine and from about 2 to about 3 moles of carbon disulfide in a hydroxylated solvent at a temperature of at least 50° C.

5. The method of making 2-mercapto-thiazoline which comprises heating a solution of one mole of ethanol amine and at least 2 moles of carbon disulfide in a hydroxylated solvent at reflux at substantially atmospheric pressures.

6. The method of making 2-mercapto-thiazoline which comprises heating a solution of one mole of ethanol amine and from about 2 to about 3 moles of carbon disulfide in a hydroxylated solvent at reflux at substantially atmospheric pressures.

7. The method of making 2-mercapto-thiazoline which comprises heating a solution of one mole of ethanol amine and from about 2 to about 3 moles of carbon disulfide and an alkali metal hydroxide at a temperature of at least 50° C.

8. The method of making 2-mercapto-thiazoline which comprises heating a solution of one mole of ethanol amine and from about 2 to about 3 moles of carbon disulfide and an alkali metal hydroxide in a hydroxylated solvent at a temperature of at least 50° C.

9. The method of making 2-mercapto-thiazoline which comprises heating a solution of one mole of ethanol amine and from about 2 to about 3 mols of carbon disulfide and about 2 moles of an alkali metal hydroxide in a hydroxylated solvent at a temperature of at least 50° C.

10. The method of making 2-mercapto-thiazoline which comprises heating a solution of one mole of ethanol amine and from about 2 to about 3 moles of carbon disulfide and about 2 moles of an alkali metal hydroxide in a hydroxylated solvent at reflux at substantially atmospheric pressures.

11. The method of making 2-mercapto-thiazoline which comprises refluxing an aqueous solution of one mole of ethanol amine and from 2 to about 3 moles of carbon disulfide and about 2 moles of sodium hydroxide.

12. A process for producing 2-mercapto thiazoline which comprises reacting one molecular proportion of ethanolamine with substantially two molecular proportions of carbon disulfide, in the presence of at least two molecular proportions of alkali.

13. A process for producing 2-mercapto-thiazoline which comprises reacting an aqueous solution of one molecular proportion of ethanolamine with substantially two molecular proportions of carbon disulfide in the presence of at least two molecular proportions of alkali.

HALSEY B. STEVENSON.